United States Patent [19]
Akita et al.

[11] Patent Number: 5,316,098
[45] Date of Patent: May 31, 1994

[54] SYSTEM FOR STEERING REAR WHEELS OF AN AUTOMOTIVE VEHICLE

[75] Inventors: Ryuya Akita; Shigefumi Hirabayashi, both of Hiroshima, Japan

[73] Assignee: Mazda Motor Corporation, Hiroshima, Japan

[21] Appl. No.: 856,697

[22] Filed: Mar. 24, 1992

[30] Foreign Application Priority Data

Mar. 31, 1991 [JP] Japan .................................. 3-93500

[51] Int. Cl.$^5$ .......................................... B62D 5/06
[52] U.S. Cl. .................................... 180/140; 180/142
[58] Field of Search ............... 280/91; 180/140, 141, 180/142, 143, 79.1; 364/424.05

[56] References Cited

U.S. PATENT DOCUMENTS 4,982,804 1/1991 Kanazawa ..................... 280/91 X

FOREIGN PATENT DOCUMENTS 44568 3/1982 Japan .
227871 10/1987 Japan .

*Primary Examiner*—David M. Mitchell
*Assistant Examiner*—Andrew C. Pike
*Attorney, Agent, or Firm*—Fish & Richardson

[57] ABSTRACT

A system for steering a rear wheel of a vehicle having a mechanism for altering a steering ratio, $\Theta S$, based on an amount of steering of the rear wheel to an amount of steering a front wheel. The system is disposed in an interconnecting mechanism for mechanically interconnecting the mechanism for steering the front wheel with the mechanism for steering the rear wheel. The value of $\Theta S$ is set by the following formula:

$$\Theta S = C1 + B \cdot C3 \cdot |Y| - C4 \cdot |dY|$$

where $\Theta S$ is a steering ratio;
$Y$ is a yaw rate of a vehicle body;
$dY$ is a yaw acceleration of the yaw rate;
$C1$ is a basic steering characteristic term;
$C3$ is a yaw rate control gain;
$C4$ is a yaw acceleration control gain; and
$B$ is a correction coefficient control gain term.

The value of B increases when the amount of steering of the front wheel is small and decreases when the amount of steering of the front wheel is large.

30 Claims, 8 Drawing Sheets

SYSTEM FOR STEERING REAR WHEELS OF AN AUTOMOTIVE VEHICLE

BACKGROUND OF THE INVENTION

1. Field of the Invention

The present invention relates to a system for steering rear wheels of an automotive vehicle and, more particularly, to a system for steering rear wheels so adapted as to steer front wheels as well as rear wheels.

2. Description of the Related Art

Among systems for steering rear wheels, there is known of such a type as electrically steering the rear wheels completely without mechanical interconnections between a mechanism for steering the rear wheels and a mechanism for steering the front wheels, as disclosed in Japanese Patent Laid-open Publication (kokai) No. 57-44,568. Such an electrically interconnecting type of the system for steering the rear wheels can offer the advantage that the rear wheels can be steered even if the front wheels are sustained in the neutral position, however, it suffers from the disadvantage that it is difficult to set the rear wheels strictly in the neutral position as the front wheels are sustained in the neutral position. Further, such a system may be likely to provide the operator with feeling of uneasiness when the rear wheels are steered in a careless manner in a state in which the front wheels are sustained in the neutral position. In addition, the system has the defect that a sufficient extent of fail measures should be taken at the time of failure.

The above-specified prior patent publication discloses steering characteristics, including a characteristic term for a yaw rate that functions as acting in the direction of converging the yaw rate, if occurred, that is, that functions as an ingredient for correcting a same phase amount in the direction of increasing.

On the other hand, Japanese Patent Laid-open Publication (kokai) No. 62-227,871 discloses a type of mechanically interconnecting a mechanism for steering the rear wheels with a mechanism for steering the front wheels and a steering-ratio altering mechanism is incorporated into such a mechanically interconnecting mechanism. This mechanically interconnecting mechanism can offer the advantage that the rear wheels can be sustained strictly in the neutral position when the front wheels are sustained in the neutral position, however, it suffers from the disadvantage that the rear wheels cannot be steered as long as the front wheels are to be steered.

It is to be noted herein that the rear wheel steering system of the electrically interconnecting type having the characteristic term for the yaw rate as the steering characteristics can negate the yaw rate by steering the rear wheels upon occurrence of the yaw rate due to a side wind during running straight at a high speed, thereby improving stability in running straight.

It is to be noted, however, that the rear wheel steering system of the mechanically interconnecting type having the characteristic term for the yaw rate sustains the rear wheels in the neutral position as long as the front wheels are held in the neutral position, so that the characteristic term for the yaw rate does not substantially serve as improving stability in running straight as long as the vehicle is running straight because the rear wheels cannot be steered even if the yaw rate would be caused to occur due to a side wind.

SUMMARY OF THE INVENTION

This invention has the object to provide a system for steering rear wheels of a mechanically interconnecting type having a characteristic term for a yaw rate as steering characteristics, which is so adapted as to improve stability in running straight.

In order to achieve the aforesaid object, this invention is so adapted as to make a control gain of a characteristic term for a yaw rate larger when a steered angle of a steering wheel is smaller than when the steered angle thereof is larger.

More specifically, this invention consists of a system for steering rear wheels of a vehicle having a mechanism for altering a steering ratio based on an amount of steering the rear wheel to an amount of steering of a front wheel. The system is disposed in an interconnecting mechanism for interconnecting mechanically the mechanism for steering the front wheel with the mechanism for steering the rear wheel. The system includes means for detecting a yaw rate of a vehicle body;

control means for controlling the mechanism for altering the steering ratio on the basis of for a yaw rate so that the rear wheel is steered through a larger angle as the yaw rate detected by the means for detecting the yaw rate becomes larger;

means for detecting a steered angle of a steering wheel; and means for altering a control gain of the yaw so that a value of the control gain for the yaw rate to becomes larger when the steered angle of the steering wheel detected by the means for detecting the steering angle is smaller, and becomes larger when the steered angle of the steering wheel detected thereby is larger.

If the yaw rate would be caused to occur, for example, due to a side wind during running straight, the operator operates the steering wheel to a slight extent in order to have the vehicle run straight. It is to be noted herein that, even if a steered angle of the steering wheel would be so small in this event, the control gain of the characteristic term for the yaw rate is set so large that the characteristic term for the yaw rate can sufficiently serve as increasing the same phase amount, thereby improving the ability of running straight. It can be noted as a matter of course that, when the steered angle of the steering wheel is made large, the control gain of the characteristic term for the yaw rate is set so small that the ability of turning a head of the vehicle is not worsened.

When a generally basic characteristic term can be set as a steering characteristic, in addition to the characteristic term for the yaw rate, a more preferred steering characteristic can be set by positioning the characteristic term for the yaw rate as an ingredient for correcting the generally basic characteristic term.

Further, it is preferred to set a steering characteristic having a characteristic term for a yaw acceleration so as to make the amount of a same phase smaller as the yaw acceleration becomes larger. In other words, if it is assumed that a steering wheel has been turned quickly, for example, from its left position through its neutral position to its right position when the vehicle is cornering on a S-shaped curved road, a yaw rate causes a delay in phase relative to the operation of the steering wheel and the previous yaw rate during previous cornering is still left at the time when the steering wheel has passed through its neutral position. It is further noted that the remaining yaw rate may increase the same phase amount, thereby worsening the ability of turning the head of the vehicle. It is to be noted, however, that the addition of the characteristic term for the yaw acceleration allows the yaw rate to cause such a delay in phase to a lesser extent and that the characteristic term for the yaw acceleration can function as decreasing the same phase amount in the vicinity of the position in which the steering wheel has passed its neutral position. As a consequence, the action of the remaining yaw rate for increasing the same phase amount can be lessened or negated in a positive way, thereby securing the ability of turning the head of the vehicle.

Other objects, features and advantages of the present invention will become apparent in the course of the description of the preferred embodiments, which follows, with reference to the accompanying drawings.

DESCRIPTION OF THE PREFERRED EMBODIMENTS

Figure 1:
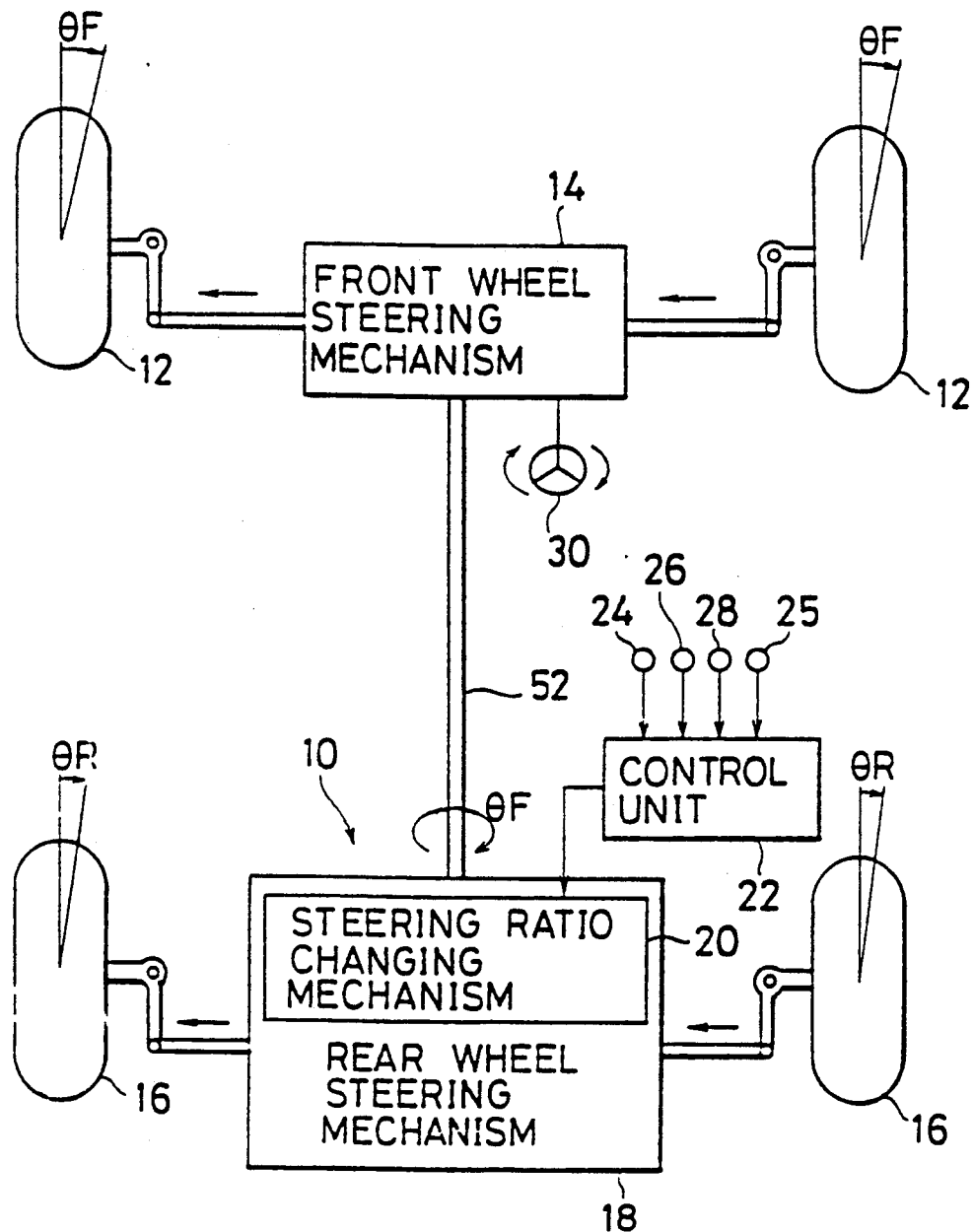
FIG. 1 is a schematic representation showing an outline of a rear wheel steering system.

As shown in FIG. 1, a left-hand front wheel 12 is interconnected with a right-hand front wheel 12 through a front wheel steering mechanism 14 and a left-hand rear wheel 16 is interconnected with a right-hand rear wheel 16 through a rear wheel steering mechanism 18. The front wheel steering mechanism 14 is connected with a steering wheel 30 and the front wheels are operatively steered to the left or to the right at a front wheel steered angle $\theta F$ by the aid of the steering wheel 30. On the other hand, the left-hand and right-hand rear wheels 16 are steered concurrently to the left or to the right each at a rear wheel steered angle $\theta R$.

The front wheel steering mechanism 14 is mechanically interconnected with the rear wheel mechanism 18 through an intermediate shaft 52 constituting an interconnecting mechanism. This arrangement can transmit the front wheel steered angle $\theta F$ through the intermediate shaft 52 to the rear wheel steering mechanism 18. The front wheel steered angle $\theta F$, that is, an amount in which the intermediate shaft 52 is operated, is transmitted through a steering-ratio changing mechanism 20 to the rear wheel steering mechanism 18 in a predetermined steering ratio $\theta S$ that may be represented as a ratio of the rear wheel steered angle $\theta R$ to the front wheel steered angle $\theta F$, i.e. $\theta R/\theta F$. Hence, even if the front wheel steered angle $\theta F$ would be the same, the rear wheel steered angle $\theta R$ may optionally be altered by the aid of the steering-ratio changing mechanism 20.

Although the steering-ratio changing mechanism 20 itself is known, an example thereof will be described more in detail. The steering-ratio changing mechanism 20 may be controlled by a control unit 22 composed, for example, of a microcomputer. The control unit 22 is arranged so as to determine a target steered angle of the rear wheel from a predetermined steering ratio $\theta S$ obtainable on the basis of a predetermined steering characteristic and to subject the steering-ratio changing mechanism 20 to feedback control to allow the actual steered angle $\theta R$ of the rear wheel 16 to reach the target steered angle while checking output of a steering ratio sensor 28 for detecting a steering ratio.

In this example, the steering characteristics are set by using a vehicle speed, a steered angle and a yaw rate as parameters. Hence, the control unit 22 is fed with signals from a vehicle speed sensor 24 for detecting a vehicle speed V, a steered angle sensor 25 for detecting a steered angle $\theta H$ of the steering wheel 30, a yaw rate sensor 26 for detecting a yaw rate Y, and the steering ratio sensor 28. It is to be noted herein that the yaw acceleration, dY, can be computed by differentiating the yaw rate Y.

For the steering characteristics to be employed in this embodiment, the steering ratio $\theta S$ can be set on the basis of the following formula (1):

$$\theta S = C1 + B \cdot C3 \cdot |Y| - C4 \cdot |dY| \qquad (1)$$

where

C1 is a basic steering characteristic term;

B is a control gain set to improve stability in running straight;

$C3 \cdot |Y|$ is a characteristic term for the yaw rate; and $C4 \cdot |dY|$ is a characteristic term for the yaw acceleration.

In the above formula, the symbol "30" means an increase in the same phase amount and the symbol "—" means a decrease in the same phase amount. Hence, the characteristic term for the yaw rate is meant to be an ingredient for increasing the same phase amount and the characteristic term for the yaw acceleration is meant to be an ingredient for decreasing the same phase amount.

It is to be noted herein that, in this embodiment, the symbols C1, C3 and C4 are set as functions K1(V), K3(V) and K4(V), respectively, that use each a vehicle speed V as a parameter. In other words, the formula (1) can be converted into formula (2):

$$\theta S = K1(V) + B \cdot K3(V) \cdot |Y| - K4(V) \cdot |dY| \qquad (2)$$

Figure 5:
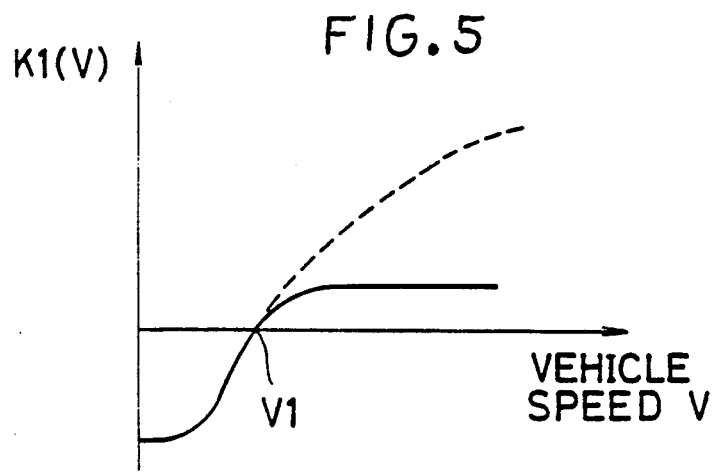
FIG. 5 is a graph showing a characteristic of a basic steering characteristic term.
Figure 6:
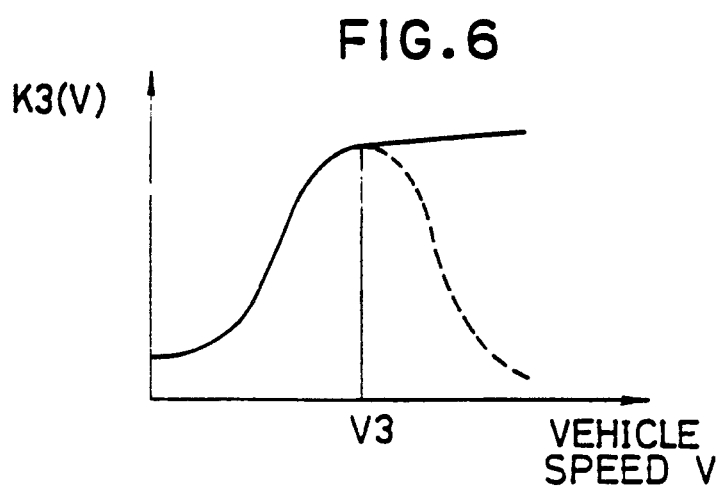
FIG. 6 is a graph showing a characteristic of the characteristic term for the yaw rate.
Figure 7:
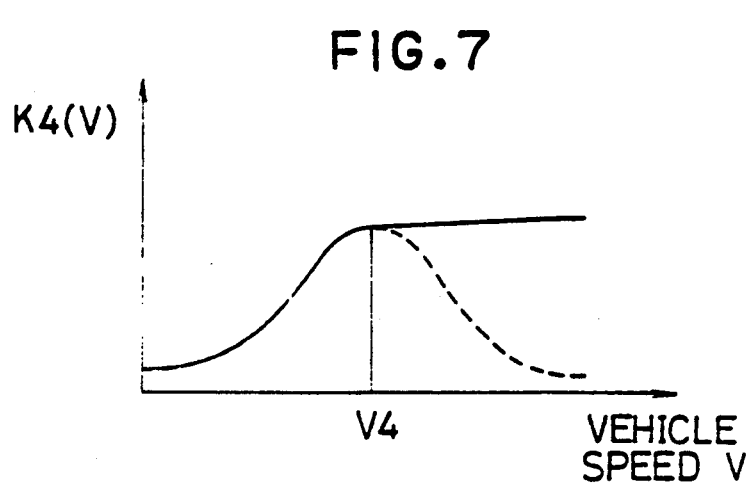
FIG. 7 is a graph showing a characteristic of the characteristic term for a yaw acceleration.

The function K1(V) is set, for example, as shown in FIG. 5, the function K3(V) is set, for example, as shown in FIG. 6, and the function K4(V) is set, for example, as shown in FIG. 7. In each of the figures are indicated two functions by the solid line and the broken line. In this embodiment, there are combined the functions as indicated by the solid lines in FIGS. 5, 6 and 7, while the functions as indicated by the broken lines in FIGS. 5, 6 and 7 are combined.

Figure 8:
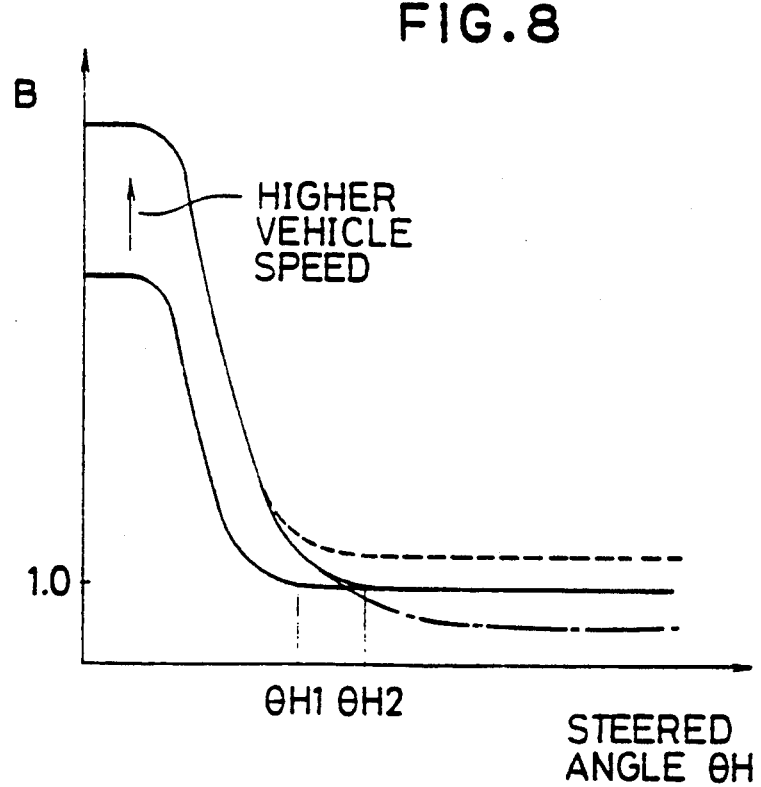
FIG. 8 is a graph showing a characteristic of a control gain B for the characteristic term for the yaw rate.

Further, the control gain B for the characteristic term for the yaw rate is set, for example, as shown in FIG. 8. As is apparent from FIG. 8, the control gain B is set to be extremely large when the steered angle $\theta H$ of the steering wheel is small. On the other hand, when the steered angle $\theta H$ is large, the control gain B for the characteristic term for the yaw rate is set to become nearly 1, thereby depending substantially upon the function K3(V) only. Given the steered angle θH of the steering wheel being small, the control gain B is set to become larger as the vehicle speed becomes higher. It is to be noted, however, that when the steered angle θH of the steering wheel is large, the characteristic may be set as indicated by the broken line or the one-dot-and-dash line in FIG. 8.

Figure 9:
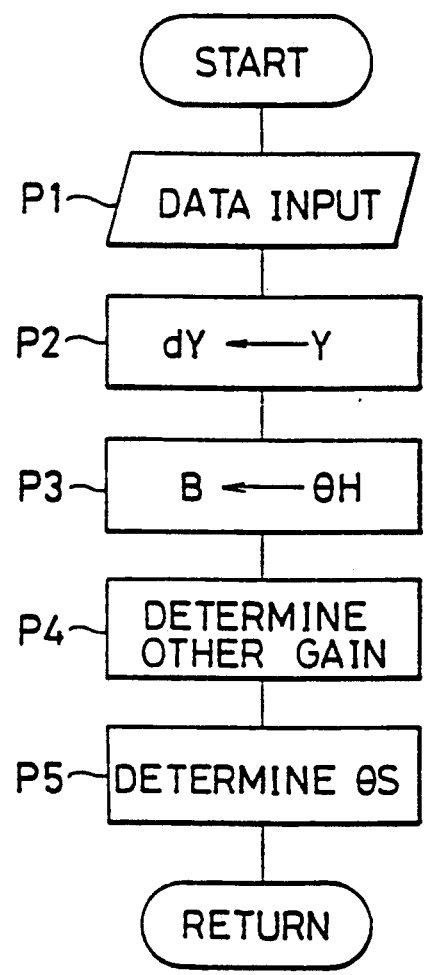
FIG. 9 is a flowchart showing a control example according to the present invention.

The system according to the present invention may be controlled on the basis of the flowchart as shown in FIG. 9.

At step P1, signals are entered into the control unit 22 from the sensors, followed by proceeding to step P2 at which the yaw rate is differentiated to give a change rate of a yaw rate, dY. Then, at step P3, the magnitude of the control gain B is determined on the basis of the steered angle θH of the steering wheel 30, followed by proceeding to step P4 at which other control gains are determined on the basis of the vehicle speed V.

Then, at step P5, the steering ratio θS is determined by entering the control gains determined hereinabove into the formula (2) above. Thereafter, the steering-ratio changing mechanism 20 (a motor 56) is subjected to feedback control so as to realize the steering ratio θS determined hereinabove.

A supplementary description will now be made of the characteristics as shown in FIGS. 5 to 8.

For the control gain K1(V) of the basic characteristic term as shown in FIG. 5, the control gain K1(V) is set as a negative value when the vehicle speed is as low as less than the predetermined vehicle speed V1, e.g. 30 km per hour, and the rear wheels are steered toward the reverse phase side to thereby improve the ability of turning the head of the body of the vehicle and ensuring the turning ability with a small diameter. On the other hand, when the vehicle speed is set as a high speed, the control gain K1(V) is set as a positive value and the rear wheels are steered toward the same phase side to thereby improve stability of the body of the vehicle. In the case as indicated by the solid line in FIG. 5, on the one hand, the control gain K1(V) is set so as to become constant or nearly constant when the vehicle speed becomes somewhat higher than the predetermined vehicle speed V1, thereby allowing the rear wheels to give the identical value of the same phase regardless of changes in the vehicle speed. In the case as indicated by the broken line in FIG. 5, on the other hand, the control gain K1(V) is set so as to become gradually larger as the vehicle speed becomes higher. When the vehicle speed is in a high speed range, the stability in the body of the vehicle is emphasized than in the case as indicated by the solid line in FIG. 5.

The control gain K3(V) of the characteristic term for the yaw rate as shown in FIG. 6 is set in such a manner that the control gain K3(V) becomes larger as the vehicle speed gets higher when the vehicle speed is lower than a predetermined vehicle speed V3, thereby enhancing the ability to converge the yaw rate to a greater extent as the vehicle speed gets higher. On the other hand, when the vehicle speed is higher than the predetermined vehicle speed V3, the control gain K3(V) is so set as to become little increased in accordance with an increase in the vehicle speed and to be kept at a nearly constant value, as indicated by the solid line in FIG. 5. Further, the instance as indicated by the broken line in FIG. 5 makes the control gain K3(V) smaller as the vehicle speed increases, so as to correspond to the setting by the broken line in FIG. 5, when the vehicle speed is set in a high-speed range, thereby setting the same phase quantity so as to fail to become too large.

For the control gain K4(V) of the characteristic term for the yaw acceleration as shown in FIG. 7, the control gain K4(V) is set so as to become larger as the vehicle speed becomes higher when the vehicle speed is lower than a predetermined vehicle speed V4. On the other hand, when the vehicle speed becomes higher than the predetermined vehicle speed V4, the instance as indicated by the solid line is set in substantially the same manner as indicated by the solid line in FIG. 6, while the instance as indicated by the broken line is set in substantially the same manner as indicated by the broken line in FIG. 6. The setting in FIG. 7 is to allow the control gain K4(V) to serve as or function as a correction term for the control gain K3(V) as indicated in FIG. 6, thereby regulating an excessive increase in the same phase quantity of the rear wheels resulting from the remaining yaw rate. Hence, the vehicle speed V3 can be set to be of a value that is equal to or substantially equal to the vehicle speed V4. It is to be noted herein that, although each of the vehicle speed V3 and the vehicle speed V4 is set to be smaller than the vehicle speed V3, the former may be set to be equal to or substantially equal to the vehicle speed V3.

The correction coefficient B for the characteristic term for the yaw rate as shown in FIG. 8 is set by using a steered angle θH as well as a vehicle speed as a parameter. Basically, the correction coefficient B becomes larger as the steered angle θH gets smaller. When the steered angle θH becomes larger than a predetermined value, the correction coefficient B is kept at a small value that is constant or substantially constant. The instance as indicated by the solid line in FIG. 8 is such that the correction coefficient B is 1 and the state is the same as if no correction is made in fact. It is further to be noted that the correction coefficient B is set larger when the vehicle speed is higher than when the vehicle speed is lower. It is to be noted, however, that a rate at which the correction coefficient B changes relative to changes in the vehicle speed becomes larger when the steered angle θH is smaller, while the rate at which the correction coefficient B changes relative to changes in the vehicle speed becomes smaller when the steered angle θH is larger. In other words, the influence of the vehicle speed upon the correction coefficient B is set to become larger when the steered angle θH is smaller than when the steered angle θH is larger. In addition, the predetermined steered angle is set so as to be changed to θH1 or θH2 in accordance with the vehicle speed. In other words, the predetermined steered angle θH1 for the lower vehicle speed is set to become smaller than the predetermined steered angle θH2 for the higher vehicle speed. As described hereinabove, the correction coefficient B is set larger as the steered angle θH is smaller, when there is the strong requirement for the stability in running straight. Likewise, when the requirement for the stability in running straight is strong, the correction coefficient B is set larger as the vehicle speed becomes larger. It is to be noted herein as a matter of course that the vehicle speed exerts an influence more upon the stability in running straight than the steered angle. On the other hand, the correction coefficient B is set to be smaller as the steered angle θH becomes larger, when much importance is attached to the requirement for the ability of turning the head of the vehicle. It is to be noted, however, that the setting of the correction coefficient B lays more stress on the stability in running straight by setting the correction coefficient B to a larger value when the correction coefficient B is set in the manner as indicated by the broken line in FIG. 8 than when the correction coefficient B is set in the manner as indicated by the solid line in FIG. 8. On the other hand, the setting of the correction coefficient B attaches more importance to the ability of turning the head of the vehicle by setting the correction coefficient B to a smaller value when the correction coefficient B is set as indicated by the one-dot-and-dash line in FIG. 8 than when the correction coefficient B is set as indicated by the solid line in FIG. 8.

A description will now be made of an example of the steering-ratio changing mechanism 20 for altering the steering ratio and a peripheral mechanism therefor.

Figure 2:
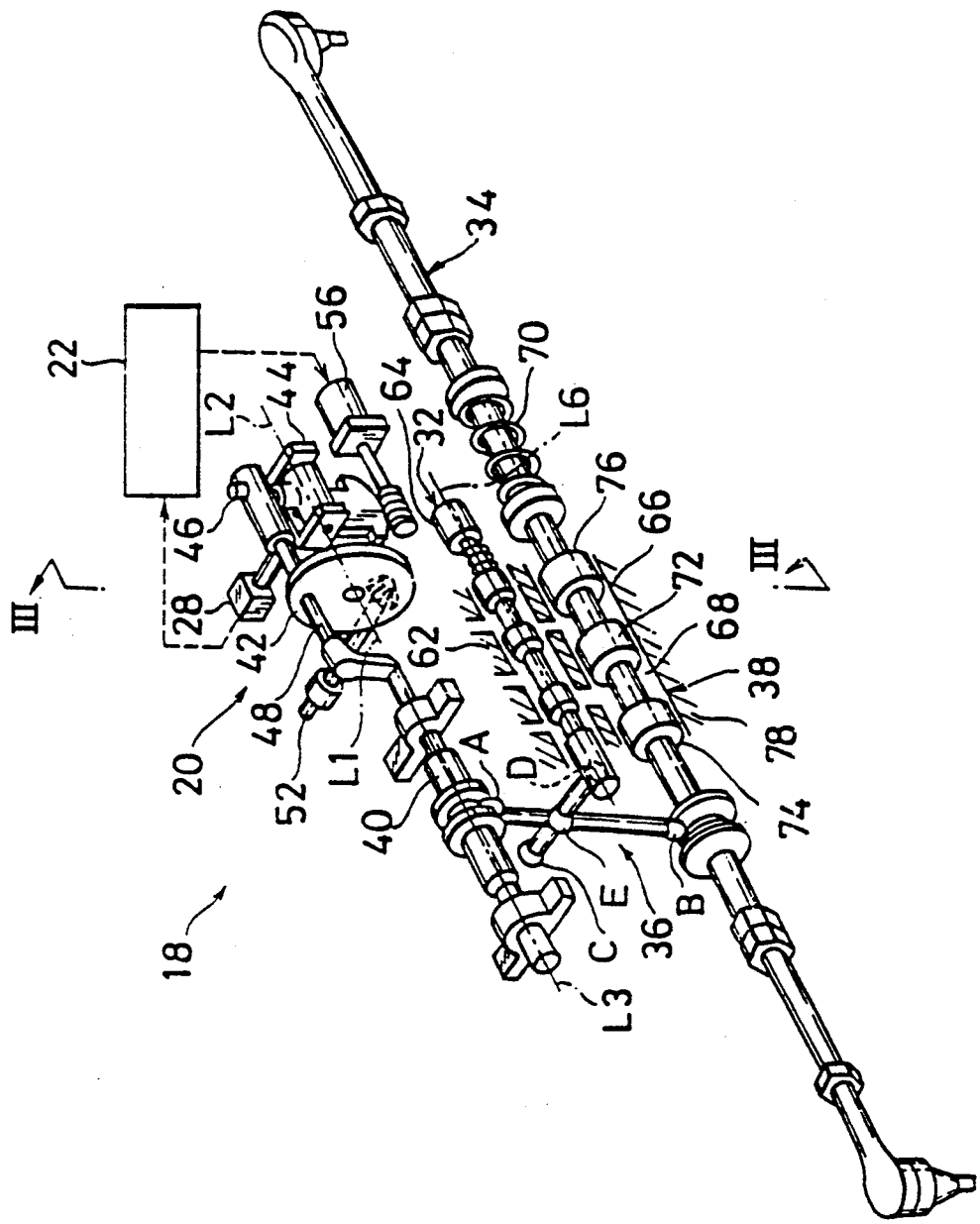
FIG. 2 is a perspective view showing a detailed portion of the rear wheel steering mechanism and a steering ratio changing mechanism.

As shown in FIG. 2, the rear wheel steering mechanism 18 has the steering-angle changing mechanism 20 incorporated thereinto, and the rear wheel steering mechanism 18 comprises a hydraulic shift valve 32, a rear wheel steering rod 34, displacement transmitting means 36 and a hydraulic power cylinder 38.

Figure 3:
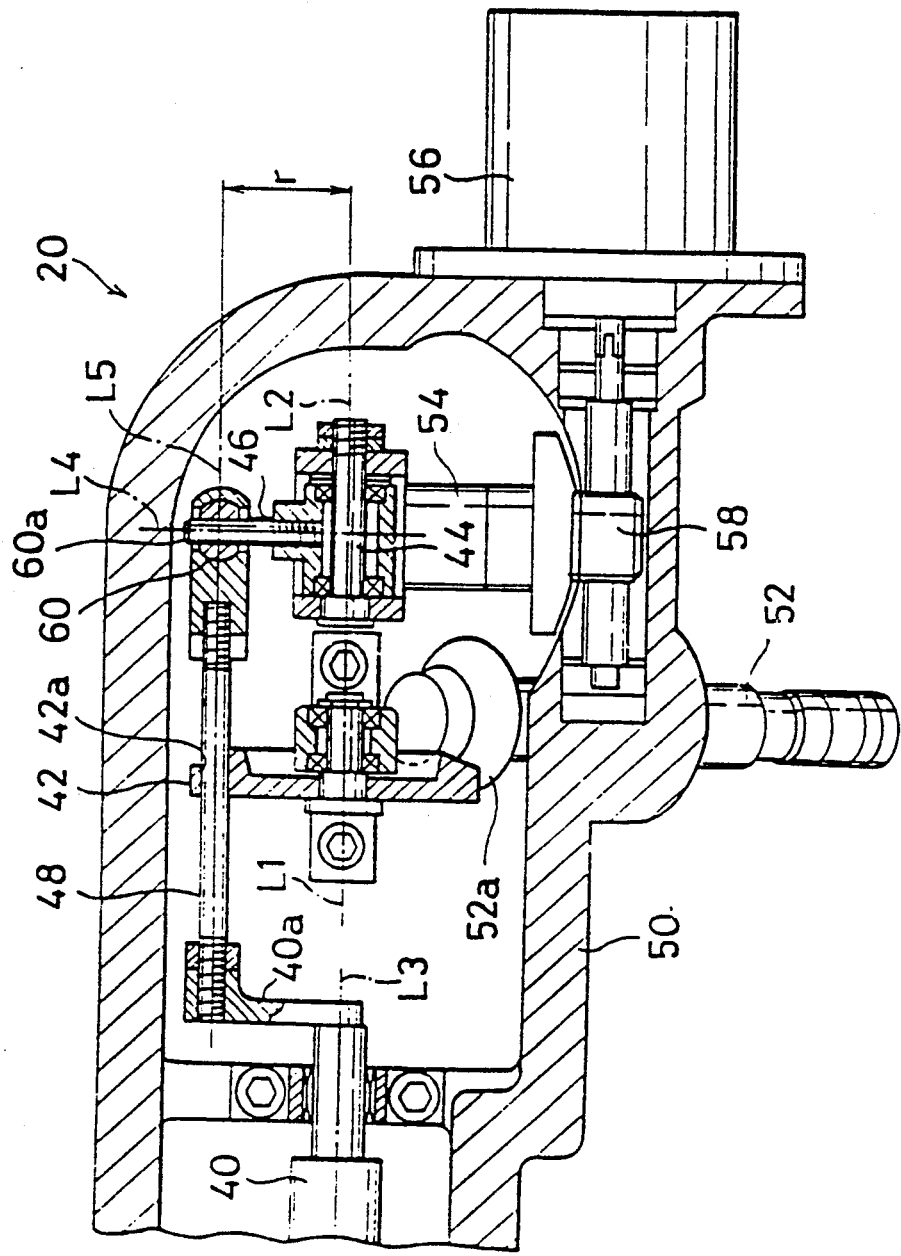
FIG. 3 is a sectional view as taken along line III—III of FIG. 2.

The steering-angle changing mechanism 20 comprises an output rod 40, a bevel gear 42, a pivotable shaft member 44, a pendulum arm 46 and a connecting rod 48. These elements are accommodated in a casing 50 in the manner as shown in FIG. 3.

The output rod 40 is supported by the casing 50 so as to be slidable in the direction of the shaft line L3 and the stroke of the output rod 40 is displaced in the direction of the shaft line L3, thereby allowing the rear wheel steering rod 34 to be displaced in the direction of the shaft (in the transverse direction of the vehicle) by the aid of the displacement transmitting means 36 and steering the rear wheels (not shown) interconnected to the both end portions of the rear wheel steering rod 34.

The bevel gear 42 is supported by the casing 50 so as to be rotatable about the shaft line L1 concentric with the shaft line L3 of the output rod 40. The bevel gear 42 is arranged so as to rotate about the shaft line L1 in association with the steering of the steering wheel which rotates a pinion 52a at the rear end portion of a transmitting shaft 52 engaged with the bevel gear 42. In other words, the front wheel steered angle θF is entered from the front wheel steering mechanism 14 through the transmitting shaft 52 into the rear wheel steering mechanism 18.

The pivotable shaft member 44 has a shaft line L2 which is concentric with the shaft line L3 of the output rod 40 and is secured to a pivotable gear 54. The pivotable gear 54 in turn is engaged with a worm gear 58 pivotable by the drive of a servo motor 56 controllable by the control unit 22, so as to rotate about the shaft line perpendicular to the plane of this drawing crossing the shaft line L2. The pivotable shaft member 44 rotates in association with the rotation of the rotary gear 54.

The pendulum arm 46 is connected with the pivotable shaft member 44 so as to be pivotable about the shaft line L2 of the pivotable shaft member 44. The position in which the pendulum arm 46 is interconnected with the pivotable shaft member 44 is determined so as to allow the shaft line L4 of the pendulum arm 46 to pass through a point of intersection of the pivotable shaft line L6 of the pivotable shaft member 44 with the shaft line L2 thereof.

The connecting rod 48 has a shaft line L5 parallel to the shaft line L3 of the output rod 40 and it connects the output rod 40 with the bevel gear 42 and the pendulum arm 46. The connection of the connecting rod 48 with the output rod 40 is made by threading one end portion of the connecting rod 48 with a lever 40a secured to an end portion of the output rod 40. The connecting rod 48 is connected with the bevel gear 42 by slidably inserting the other end portion of the connecting rod 48 into a through hole 42a formed in the bevel gear 42 in the distance r from the shaft line L1 of the bevel gear 42. In addition, the connection of the connecting rod 48 with the pendulum arm 46 is made by slidably inserting the pendulum arm 46 into a through hole 60a formed in a ball joint member 60 disposed rotatably in all directions at the end portion of the connecting rod 48.

The connecting rod 48 is fixed to the output rod 40, although it is slidable relative to the bevel gear 42 in the direction of the shaft line L5, i.e. the shaft line L3, as well as relative to the pendulum arm 46 in the direction of the shaft line 4, i.e. in the direction perpendicular to the shaft line L3 in the state as shown in the drawing. It is noted herein that the shaft line L4 of the pendulum arm 46 leans relative to the direction perpendicular to the shaft line L3 by the pivotal movement of the pivotable shaft member 44 and the pendulum arm 46 pivots in this lean direction. In this case, too, the component of force in the direction perpendicular to the shaft line L3 out of the force to be transmitted from the pendulum arm 46 to the connecting rod 48 is absorbed at the connected point, because the pendulum arm 46 can slide in the direction perpendicular to the shift line L3 relative to the ball joint member 60 and because the pivotal movement of the ball joint member 60 allows the angle formed between the shaft line L4 and the shaft line L5 to change. This arrangement can allow a movement of the pendulum arm 46 in the perpendicular direction relative to the connecting rod 48.

As the pendulum arm 46 of the steering-ratio changing mechanism 20 is connected with the connecting rod 48 so as to be movable relatively with each other in the direction perpendicular to the shaft line L3 in the manner as described hereinabove, the connecting point at which the pendulum arm 46 is connected with the connecting rod 48 is drawn as a circular locus or an oval locus on an external surface of a cylinder having a radius r concentric with the shaft line L3, when the pendulum arm 46 pivots.

Figure 4:
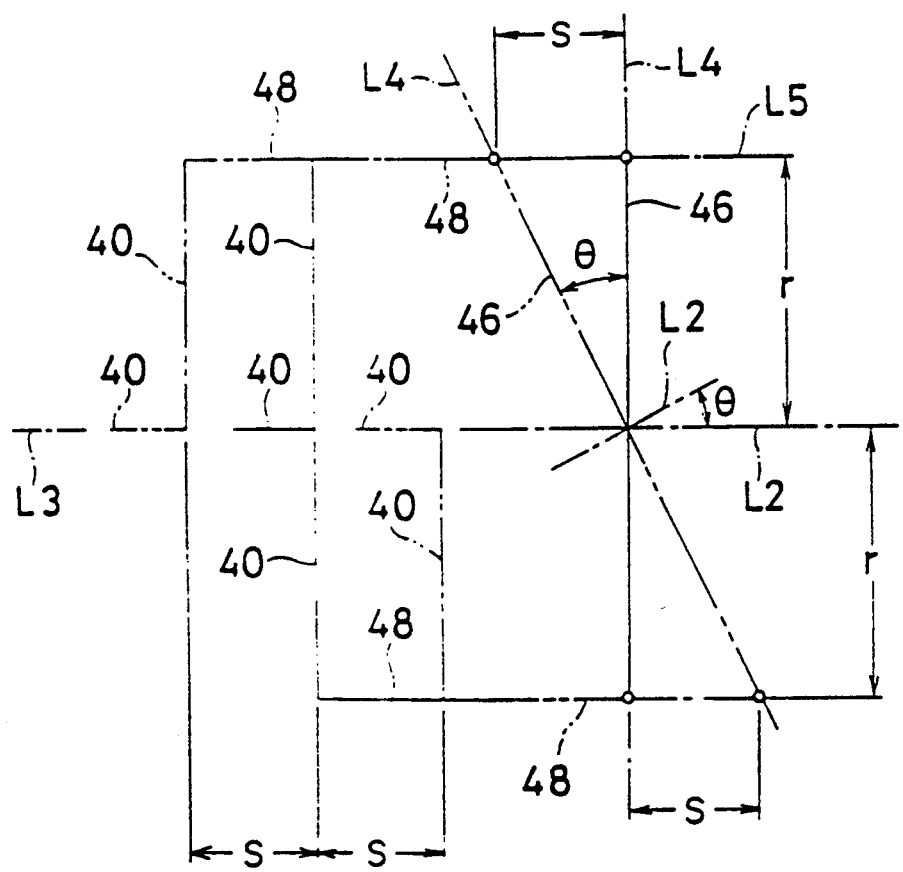
FIG. 4 is a schematic representation showing the principle of an operation of the steering ratio changing mechanism.

FIG. 4 shows the state in which the output rod 40 displaces when the shaft line L2 of the pivotable shaft member 44 is leaned at an angle θ relative to the shaft line L3 of the output rod 40, i.e. when the shaft line L4 of the pendulum arm 46 is leaned at the angle θ relative to the direction perpendicular to the shaft line L3. As is apparent from FIG. 4, even if the pendulum arm 46 would pivot to the left or to the right, the connecting point of the pendulum arm 46 with the connecting rod 48 displaces in the distance as indicated by "S" in the direction of the shaft line L3 when the quantity of a left-hand pivotal movement of the pendulum arm 46 is equal to the quantity of a right-hand pivotal movement thereof. Further, as the output rod 40 is connected and fixed to the connecting rod 48, the output rod 40 displaces in the distance S in either of the left-hand or right-hand direction of the shaft line L3.

The quantity "S" in which the output rod 40 displaces to the right or to the left, as shown in FIG. 4, becomes equal to each other, if the quantity in which the pendulum arm 46 swings to the left and to the right would be equal to each other. It is to be noted herein that the quantity S itself varies with the magnitude of the angle $\theta$ of inclination of the pendulum arm 46 even if the quantity in which the steering wheel is steered would be the same and the quantity in which the bevel gear 42 rotates in association with the steering of the steering wheel would be the same. Hence, the steered ratio $\theta S$ representing a ratio of the rear wheel steered angle $\theta R$ to the front wheel steered angle $\theta F$ is set or altered by setting or altering the magnitude of the angle $\theta$ of inclination of the pendulum arm 46 by the aid of an operation of the servo motor 56. Further, the pivotable shaft member 44 is so arranged as to lean in the clockwise direction as well as in the counterclockwise direction in the manner as described hereinabove, and the direction of moving the output rod 40 relative to the rotation of the bevel gear 42 is inverted when the pivotable shaft member 44 is leaned in the clockwise direction. This reverse movement of the output rod 40 allows the steering wheel to steer the rear wheels to the same phase or to the reverse phase relative to the front wheels.

Referring again to FIG. 2, the steering ratio $\theta S$ set and altered by the steering-ratio changing mechanism 20 is detected on the basis of the angle $\theta$ of inclination of the pivotable shaft member 44 by means of a steering ratio sensor 28 mounted to the pivotable shaft member 44.

A description will now be made of the other parts other than the steering-ratio changing mechanism 20.

The hydraulic shift valve 32 comprises a valve housing 62 and a spool 64 accommodated within the valve housing 62 so as to be displaced relative to the valve housing 62 in the direction of the shaft line L6 parallel to the shaft line L3 of the output rod 40. The spool 64 is arranged so as to be displaced through the displacement transmitting means 36 by the output rod 40 and the rear wheel steering rod 34. The displacement of the spool 64 controls a supply of hydraulic pressure to the hydraulic power cylinder 38. In other words, the hydraulic pressure is supplied to a right-hand oil chamber 66 of the hydraulic power cylinder 38 when the spool 64 is displaced from the neutral position to the right relative to the valve housing 62. On the other hand, the hydraulic pressure is supplied to a left-hand oil chamber 68 of the hydraulic power cylinder 38 when the spool 64 is displaced from the neutral position to the left relative to the valve housing 62.

The rear wheel steering rod 34 is disposed extending in the transverse direction of the vehicle parallel to the shaft line L3 of the output rod 40 and is displaced in the transverse direction to steer the rear wheels interconnected to the left-hand and right-hand ends of the rear wheel steering rod 34 through a tie rod and a knuckle arm, although not shown in the drawings. The rear wheel steering rod 34 is displaced by the aid of hydraulic force of the hydraulic power cylinder 38. A centering spring 70 is provided with the rear wheel steering rod 34 as fail-safe measures in case of disappearance of hydraulic pressure due to damages or failure of a hydraulic system of the hydraulic shift valve 32 and the hydraulic power cylinder 38 or in case of a loss of hydraulic pressure from the hydraulic power cylinder 38 due to damages or failure of a mechanical system of a rear wheel steering unit 10 and due to the opening of the hydraulic system to a drain. The centering spring 70 aligns the rear wheel steering rod 34 in its neutral position, i.e. in the position in which the rear wheels are not steered and are in a straight running state.

The hydraulic power cylinder 38 displaces the rear wheel steering rod 34 in the transverse direction of the vehicle by the aid of its hydraulic power. To the rear wheel steering rod 34 is directly fixed a piston 72, and a left-hand sealing member 74 for forming the left-hand oil chamber 68 is disposed at the left-hand side of the piston 72, while a right-hand sealing member 76 for forming the right-hand oil chamber 66 is disposed at the right-hand side of the piston 72. The left-hand and right-hand sealing members 74 and 76 are secured to a valve housing 78 of the hydraulic power cylinder 38 so as to be slidable relative to the rear wheel steering rod 34.

The displacement transmitting means 36 is engaged with the output rod 40, the spool 64 and the rear wheel steering rod 34 and operated in the direction so as to displace the spool in a predetermined direction when the output rod 40 is displaced. Further, by the displacement of the rear wheel steering rod 34 to be caused when the spool 64 is displaced, the displacement transmitting means 36 is operated in the direction in which the spool 64 is displaced in the direction opposite to the aforesaid direction.

In other words, the displacement transmitting means 36 is composed of a cross lever consisting of a longitudinal lever and a transverse lever. One end A of the longitudinal lever is secured to the output rod 40, while the other end B thereof is secured to the rear wheel steering rod 34. On the other hand, one end C of the transverse lever is fixed to a casing of the rear wheel steering unit 10 secured to the body of the vehicle, while the other end D thereof is engaged with the spool 64. Each of the ends A, B and D is disposed so as to be unmovable relative to the output rod 40, the rear wheel steering rod 34 and the spool 64 in the direction of the respective shaft lines, yet movable or rotatable in the other directions. The end C of the transverse lever is engaged so as to be rotatable with the aid of a ball joint yet untransferable.

As described hereinabove, the system according to the embodiment of the present invention allows the rear wheels connected to both end portions of the rear wheel steering rod 34 to be steered by displacing the rear wheel steering rod 34 in its axial direction via the displacement transmitting means 36 by displacing the stroke of the output rod 40 in the direction of the shaft line L3. A description on the principle of the operation for transmitting the steering quantity will be omitted from the following specification because the principle has nothing to do directly with the present invention and it is disclosed in detail in Japanese Patent Laid-open Publication (kokai) No. 1-273,772.

Figure 10:
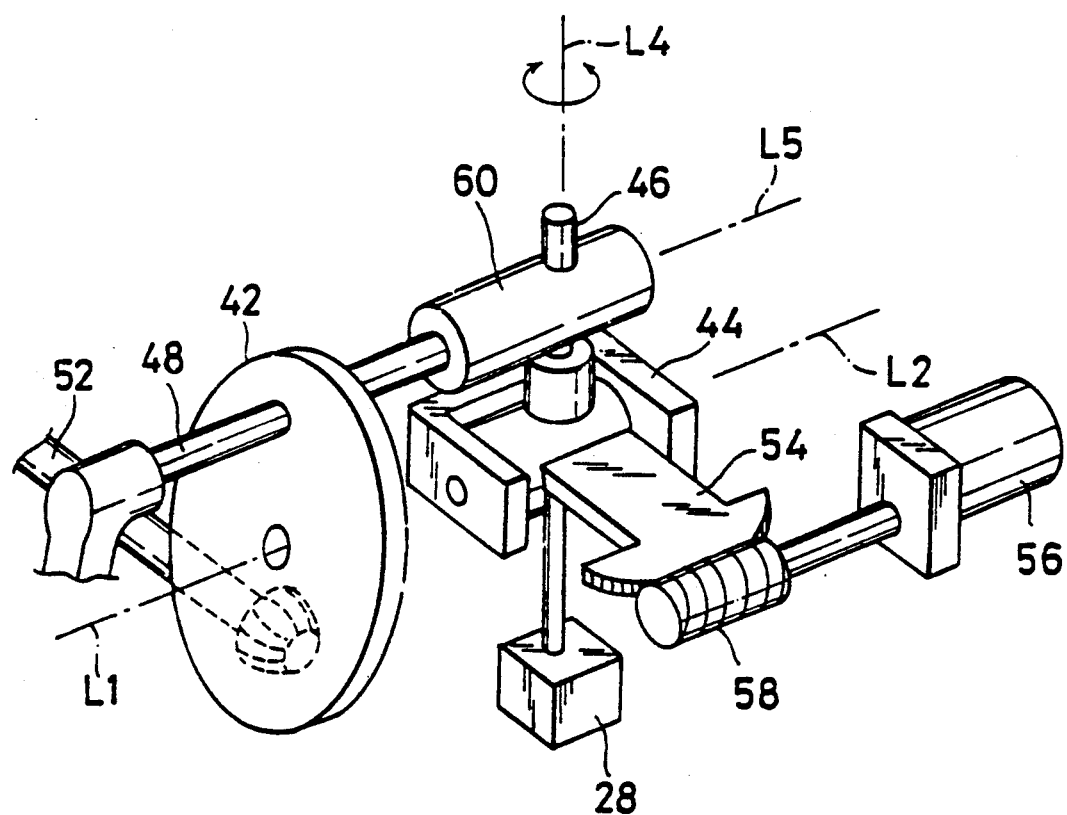
FIG. 10 is a perspective view showing another example of the steering ratio changing mechanism.

FIG. 10 shows a modification of the steering-ratio changing mechanism 20, in which the same elements are provided with the same reference symbols, and a description of those elements will omitted from the description which follows.

Referring to FIG. 10, a pivotal gear 54 is disposed to project in the direction that deviate from the aforesaid embodiment at the angle of 90°. When the motor 56 rotates in the normal direction or in the reverse direction, the worm gear 58 rotates, thereby allowing the pivotal gear 54 to pivot and as a consequence causing the pivotal arm 46 to pivot about its shaft line L4. It is noted that FIG. 10 shows the state in which the front wheels are located in their neutral positions. In this state, the ball joint member 60 is not displaced at all in the direction of the shaft line L5 and the rear wheels are not steered even if the shaft line L2 pivots about the shaft line L5 by swinging the pivotal arm 46 about the shaft line L4. In other words, the rear wheels are always kept in the neutral positions as long as the front wheels are located in their neutral positions. The rear wheels are steered when the front wheels are steered in a state in which the pivotal arm 46 pivots about the shaft line L4 so as for the shaft line L2 to lean relative to the shaft line L5.

The present invention is not intended in any manner to be limited to the embodiments as described hereinabove, and it is to be understood that any changes or variations or modifications made so as not to deviate from the basic concepts of the present invention are interpreted as being contained within the spirit and scope of the present invention.

What is claimed is:

1. A system for steering a rear wheel of a vehicle having a mechanism for altering a steering ratio of an amount of steering of the rear wheel to an amount of steering of a front wheel, disposed in an interconnecting mechanism for mechanically interconnecting a mechanism for steering the front wheel with a mechanism for steering the rear wheel, comprising:
    means for detecting a yaw rate of a vehicle body;
    control means for controlling the mechanism for altering the steering ratio on the basis of the yaw rate so that the rear wheel is steered through a larger angle as the yaw rate increases;
    means for detecting a steered angle of a steering wheel; and
    means for altering a control gain of the yaw rate so that a value of the control gain increases when the steered angle of the steering wheel is small and decreases when the steered angle is large.

2. A system as claimed in claim 1, wherein the control gain for the yaw rate is set using a vehicle speed as a parameter.

3. A system as claimed in claim 2, wherein the control gain for the yaw rate contains a term for a basic control gain and a correction coefficient control gain term; and wherein the basic control gain for the yaw rate is set so as to increase as the vehicle speed increases at least when the vehicle speed is lower than a predetermined value.

4. A system as claimed in claim 1, wherein the means for altering the control gain alters the control gain for the yaw rate using a vehicle speed as a parameter.

5. A system as claimed in claim 4, wherein the means for altering the control gain increases a ratio of a quantity of altering the control gain to a quantity of altering the vehicle speed as the steered angle decreases.

6. A system as claimed in claim 4, wherein the means for altering the control gain increases the control gain for the yaw rate as the vehicle speed decreases.

7. A system as claimed in claim 6, wherein the means for altering the control gain suspends alteration of the control gain for the yaw rate using the vehicle speed when the steered angle becomes larger than a predetermined value.

8. A system as claimed in claim 1, wherein the control gain for the yaw rate contains a term for basic control gain and a correction coefficient control gain term; and
    the means for altering the control gain is set by setting the correction coefficient control gain term using the steered angle as a parameter.

9. A system as claimed in claim 8, wherein the term for basic control gain is set using a vehicle speed as a parameter.

10. A system as claimed in claim 9, wherein the correction coefficient control gain term is further set using the vehicle speed as a parameter.

11. A system as claimed in claim 10, wherein the correction coefficient control gain term is set to increase when the steered angle is small and to decrease when the steered angle is large.

12. A system as claimed in claim 11, wherein the correction coefficient control gain term is set to be substantially constant when the steered angle is larger than a predetermined value.

13. A system as claimed in claim 1, wherein said steering ratio is further altered by a basic characteristic term, and the control gain for the yaw rate serves as a term for correction the basic characteristic term.

14. A system as claimed in claim 13, wherein said basic characteristic term is set using a vehicle speed as a parameter.

15. A system as claimed in claim 14, wherein the steering of the front wheel defines a front direction and wherein the basic characteristic term is set for the rear wheel as to be in a reverse direction relative to the front direction when the vehicle speed is lower than a predetermined value and to be in a same direction as the front direction when the vehicle speed is higher than the predetermined value.

16. A system as claimed in claim 14, wherein the steering of the front wheel defines a front direction, and wherein the basic characteristic term is set for the rear wheel to be steered relatively in a direction the same as the front direction when the vehicle speed increases.

17. A system as claimed in claim 1, wherein the control means alters the steering ratio based on a control gain for a yaw acceleration, and wherein the steering of the front wheels defines a front direction, and wherein the control gain for the yaw acceleration decreases the amount of steering of the rear wheel in a direction the same as the front direction as the yaw rate increases.

18. A system as claimed in claim 17, wherein the control gain for the yaw acceleration is set using ak vehicle speed as a parameter.

19. A system as claimed in claim 1, wherein the control means alters the steering ratio based on a control gain for a yaw acceleration, and wherein the control gain for the yaw acceleration decreases as the yaw acceleration increases.

20. A system as claimed in claim 1, wherein each of the basic characteristic term, the control gain for the yaw rate and the control gain for the yaw acceleration is set using a vehicle speed.

21. A system as claimed in claim 20, wherein the basic characteristic term is set to to have a negative value when the vehicle speed is lower than a predetermined value and to have a positive value when the vehicle speed is higher than the predetermined value.

22. A system as claimed in claim 1, wherein said interconnecting mechanism has an intermediate shaft extending in a longitudinal direction of the vehicle for transmitting the amount of steering of the front wheel steering mechanism as an amount of a pivotal movement to the rear wheel steering mechanism.

23. A system as claimed in claim 22, wherein said steering-ratio altering mechanism is interposed between said intermediate shaft and the rear wheel steering mechanism.

24. A system as claimed in claim 23, wherein said steering-ratio altering mechanism comprises:

an output member associated with the rear wheel steering mechanism so as to be displaced in a direction of a predetermined shaft line;

a pivotable arm whose pivotal center is disposed substantially in a second shaft line in which the output member moves, so as to pivot in accordance with a pivotal movement of said output member;

a motor for altering an angle of inclination of said pivotable arm relative to the second shaft line in which the output member moves; and an interconnecting member for interconnecting a top end portion of said pivotable arm with said output member.

25. A system as claimed in claim 24, further comprising a gear member which pivots about said predetermined shaft line in accordance with the pivotal movement of the intermediate shaft; and said interconnecting member is slidably inserted into an concentric position with said gear member and the pivotal movement of said pivotable arm through said gear member and said interconnecting member.

26. A system as claimed in claim 24, wherein:

said pivotable arm is inclined by said motor by allowing said pivotable arm to pivot about a third shaft line of said pivotable arm and inclining a pivotal shaft line of said pivotable arm relative to said predetermined shaft line; and said output member is not displaced from a neutral position, regardless of pivotal movement of said pivotable arm, when a steering wheel is located in a neutral steering position.

27. A system as claimed in claim 23, further comprising means for transmitting output of said steering-ratio altering mechanism to said rear wheel steering mechanism.

28. A system as claimed in claim 27, wherein said means for transmitting is of a hydraulic type.

29. A system for steering a rear wheel of a vehicle comprising:

a front steering mechanism;

a rear steering mechanism;

a control unit;

means for measuring ak yaw rate of a vehicle body and for inputting into the control unit a signal indicative of the yaw rate;

means for measuring an amount of steering of a front wheel, and for inputting to the control unit a signal indicative of the amount of steering;

wherein the control unit has an output signal $\Theta S$ indicative of a steering ratio, set by the following formula:

$$\Theta S = C1 + B \cdot C3 \cdot |Y| - C4 \cdot |Dy|$$

where

Y is a yaw rate of a vehicle body;

Dy is a yaw acceleration of the yaw rate;

C1 is a basic steering characteristic term;

C3 is a yaw rate control gain;

C4 is a yaw acceleration control gain; and

B is a correlation coefficient control gain term;

wherein B is set to increase when the amount of steering of the front wheel is small and to decrease when the amount of steering of the front wheel is large; and a mechanism for taking the output signal $\Theta S$ from the control unit and for altering the output signal $\Theta S$ based on the amount of steering of the rear wheel to an amount of steering a front wheel.

30. A system as claimed in claim 29, wherein each of C1, C3 and C4 is set as a function set using a vehicle speed as a parameter.

* * * * *